(12) United States Patent
Calistro et al.

(10) Patent No.: US 6,486,794 B1
(45) Date of Patent: Nov. 26, 2002

(54) METHOD OF LOCATING A SUBSCRIBER UNIT WITHIN THE COVERAGE AREA OF A COMMUNICATION SYSTEM

(75) Inventors: Enrique E. Calistro, Cooper City, FL (US); Robert S. Flippo, Deerfield Beach, FL (US); Troy A. Bailey, Lake Worth, FL (US)

(73) Assignee: Motorola, Inc., Schaumberg, IL (US)

( * ) Notice: Subject to any disclaimer, the term of this patent is extended or adjusted under 35 U.S.C. 154(b) by 1252 days.

(21) Appl. No.: 08/628,361

(22) Filed: Apr. 5, 1996

Related U.S. Application Data

(63) Continuation-in-part of application No. 08/606,950, filed on Feb. 26, 1996, now Pat. No. 5,740,541.

(51) Int. Cl.⁷ .............................................. H04M 11/00
(52) U.S. Cl. .................. 340/825.49; 455/456; 455/457; 340/825.36
(58) Field of Search ..................... 340/825.49, 825.44, 340/825.36; 379/56.1; 455/39, 503, 440, 441, 11.1, 13.1, 500, 456, 457; 370/310, 312, 313, 314, 328

(56) References Cited

U.S. PATENT DOCUMENTS 3,663,762 A * 5/1972 Joel, Jr. ......................... 379/58
4,578,815 A * 3/1986 Persinotti ....................... 455/15
4,644,347 A   2/1987 Lucas et al. ............. 340/825.04
4,654,879 A * 3/1987 Goldman et al. .............. 455/33
5,193,091 A * 3/1993 Crisler et al. ............... 370/95.1
5,390,366 A * 2/1995 Kasugai ....................... 455/56.1
5,572,221 A * 11/1996 Marlevi et al. ............... 342/452
5,684,859 A * 11/1997 Chanroo et al. ............... 379/58

* cited by examiner

Primary Examiner—Michael Horabik
(74) Attorney, Agent, or Firm—Randi L. Dulaney

(57) ABSTRACT

In a communication system (800) having transmitters (108) for transmitting location information to subscriber units (102) located with the transmitters' coverage areas, a method of determining the location of a subscriber unit. At least some of the transmitters use different assigned time intervals to transmit their information, and a subscriber unit receiving such information can determine its location based, at least in part, on the time interval during which it received information. Received location information is stored in a dedicated portion (808) of a subscriber unit's memory for later retrieval by the user. In a two-way system, a subscriber unit can transmit its stored location information to a system receiver (802) for storage in a system memory (804). The system memory (804) is accessed by a system operator or other authorized person to determine the location of a subscriber unit and/or its pattern of movement throughout the coverage areas.

14 Claims, 10 Drawing Sheets

METHOD OF LOCATING A SUBSCRIBER UNIT WITHIN THE COVERAGE AREA OF A COMMUNICATION SYSTEM

CROSS REFERENCE TO RELATED APPLICATION

This Application is a Continuation-in-Part of U.S. application Ser. No. 08/606,950, Filed Feb. 26, 1996 now U.S. Pat. No. 5,740,541.

FIELD OF THE INVENTION

This invention relates in general to RF (Radio Frequency) networks, and particularly to such networks that communicate with selective call receivers.

BACKGROUND OF THE INVENTION

Conventional wireless local area networks can be located within a wireless wide area network, with both types of networks operating on a single RF channel. A complex communication architecture is required to coordinate communication between the local area networks and the wide area network. In one such architecture, a synchronization link is utilized to coordinate a master-slave relationship between the wide area network and local area networks.

In a master-slave architecture, the wide area network is considered the master while the local area networks are the slaves. As the master, the wide area network takes priority for communicating with selective call receivers for which it has messages. Thus, when traffic density is high, the synchronization link gives the wide area network communication priority over the local area networks.

In order to prevent a lockout of the local area networks, the synchronization link restricts the wide area network from communicating with the selective call receivers beyond a predetermined time period. Once the predetermined time period has been exceeded, the synchronization link transfers communication priority to the local area networks.

Although this architecture is sometimes effective in delivering messages to selective call receivers, during times of high traffic densities it can prevent local area transmitters from delivering messages promptly to selective call receivers in their respective coverage areas. This situation can result in message latencies for local area networks that are inconsistent with customer expectations.

Thus, what is needed is a method and apparatus that provides prompt delivery of messages by wireless local area networks located within a wireless wide area network, with both networks operating on the same RF channel.

DESCRIPTION OF THE PREFERRED EMBODIMENT

Figure 1:
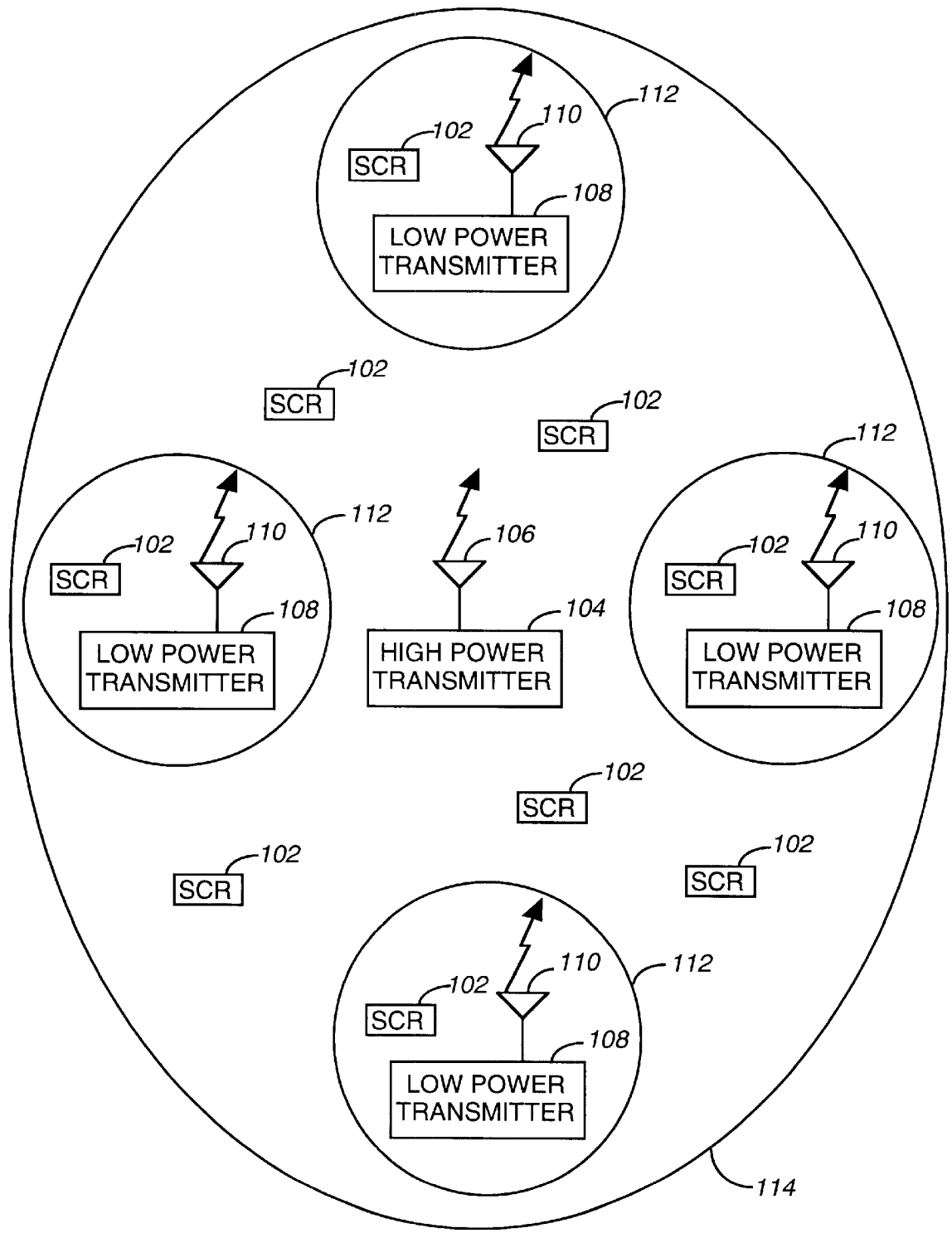
FIG. 1 is an electrical block diagram of a communication system that operates according to the present invention.

FIG. 1 is an electrical block diagram of a communication system 100 that operates according to the present invention. The illustrated communication system includes a relatively high power transmitter 104 for transmitting, on a given frequency, messages to selective call receivers 102 located within a relative wide coverage area 114. In addition, the communication system 100 includes a plurality of relatively low power transmitters 108 for transmitting, on the same given frequency, messages to selective call receivers 102 located within a plurality of relatively smaller coverage areas 112 that each overlap the relatively wide coverage area 114.

The high power transmitter 104 is coupled to a conventional transmitter antenna 106 for transmitting selective call messages to selective call receivers 102 located anywhere within the wide coverage area 114, including receivers 102 that are located within the smaller coverage areas 112. Radio frequency (RF) signals are transmitted by the high power transmitter 104 utilizing conventional means such as, for example, frequency shift-keyed (FSK) signals for transmitting digitized messages.

Similarly, each low power transmitter 108 is coupled to a conventional transmitter antenna 110 for transmitting information, including message codes and/or conventional messages, to selective call receivers 102 located within its own small coverage area 112. RF signals are transmitted by the low power transmitter 108 utilizing the same modulation scheme utilized by the high power transmitter. In contrast to the high power transmitter 104, the low power transmitter 108 has a limited transmission range for RF signals that can be intercepted by the selective call receivers 102. This range is essentially limited to the boundary of the small coverage area 112 shown in FIG. 1.

In operation, an individual receiver 102 may remain within a single given small coverage area 112, in which case it will be able to receive transmissions from the high power transmitter 104 and from the low power transmitter 108 that is located in the same given small coverage area 112.

Alternately, one or more of the receivers 102 may be expected to roam throughout the wide coverage area 114. In this case, the roaming receiver 102 could pass through all the smaller coverage areas 112 and through portions of the wide coverage area 114 that are not within one of the small coverage areas 112. Such a receiver will, as described later, be able to receive transmissions from the high power transmitter 104, as well as from each low power transmitter 108 that it comes within range of. In addition, the receiver 102 is able to determine which coverage area it is located in, and the route it followed, as will be described later.

Figure 2:
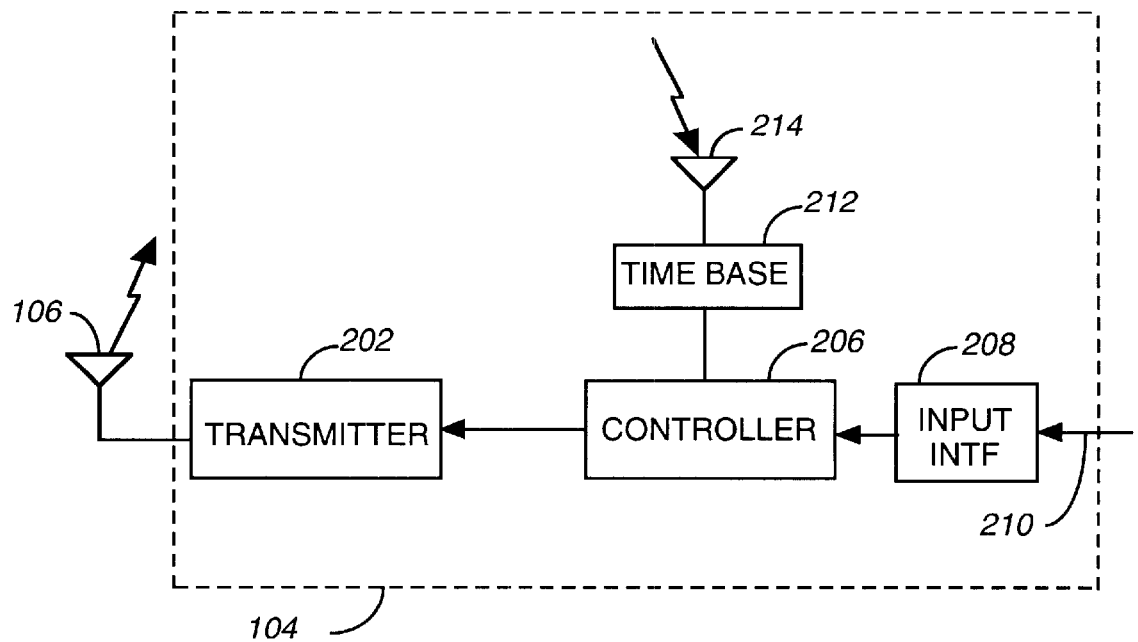
FIG. 2 is an electrical block diagram of the high power transmitter shown in FIG. 1.

FIG. 2 is an electrical block diagram of the high power transmitter 104. The block diagram includes an input interface 208, a controller 206, a time base 212, a time base antenna 214, and a transmitter 202.

The input interface 208 is coupled to a conventional wire communication link 210 such as, for example, a conventional telephone line coupled to a public switch telephone network (PSTN) for receiving messages originated by callers using a conventional telephone unit. It will be appreciated that, alternatively, the wire communication link 210 can be replaced with a conventional wireless communication link such as, for example, a microwave communication link.

The controller 206 is a conventional computer system used for controlling the operation of the high power transmitter 104. The controller 206 is coupled to the input interface 208 for receiving voice or data messages originated by a caller. The messages are processed by the controller 206 in accordance with a communication protocol utilized by the communication system (to be described below). The processed messages become selective call messages intended for transmission to one or more selective call receivers 102 located within the wide coverage area 114.

The time base 212 receives synchronization signals from a common time base such as, for example, a global positioning satellite (GPS). The synchronization signals are intercepted by the time base antenna 214 utilizing conventional means well known in the art. The time base 212 uses these signals to synchronize itself to the communication protocol.

The controller 206 is coupled to the time base 212 in order to process the selective call messages in a manner that synchronizes them to the communication protocol. The synchronized selective call messages are delivered by the controller 206 to the transmitter 202, which then modulates them for transmission to the selective call receivers 102 via antenna 106. The transmitter 202 transmits the selective call messages at an RF power level sufficient for the RF signals transmitted to be intercepted by selective call receivers 102 located anywhere within the wide coverage area 114, including those located within any one of the small coverage areas 112.

The low power transmitters 108 use substantially the same elements described in FIG. 2, with a few exceptions. An input interface like 208 is used by the low power transmitter 108 for receiving information, preferably in the form of message codes, for transmission to selective call receivers. A message code is a short digitized code (e.g., 8 bits) transmitted to one or more selective call receivers 102 for recalling a selected canned message from the memory of the intended selective call receiver 102 and presenting the canned message to user(s) of the selective call receiver(s) 102.

It will be appreciated that, in addition to message codes, the low power transmitter 108 can receive message information from the input interface 208. This message information is transmitted along with the message code to the selective call receivers 102 located in the small coverage area 112. The message information comprises, for example, alpha-numeric messages or voice messages.

The input interface in a low power transmitter receives message codes from, for example, a local area controller (not shown) coupled to the low power transmitters 108 by way of conventional wire communication links, such as links 210. Alternatively, the low power transmitters 108 may be preprogrammed with the message codes, thereby eliminating the need for an input interface and a wire communication link in the low power transmitter 108.

The message codes are selectively transmitted by the low power transmitters 108 to the selective call receivers 102 by modulating the message codes at an RF power level sufficient for the generated RF signals to be intercepted by selective call receivers 102 located within a small coverage area 112. Selective call receivers 102 located outside the small coverage area 112 are not able to intercept the transmitted message codes.

There are several important similarities between the high power transmitter 104 and the low power transmitters 108. First, both types of transmitters use the same communication protocol. Second, the time base 212 of each transmitter receives synchronization signals from the same common time base, i.e., the GPS time base. This allows the high power transmitter 104, and the plurality of low power transmitters 108 to synchronously transmit messages on the same communication protocol without interfering with each other.

Figure 3:
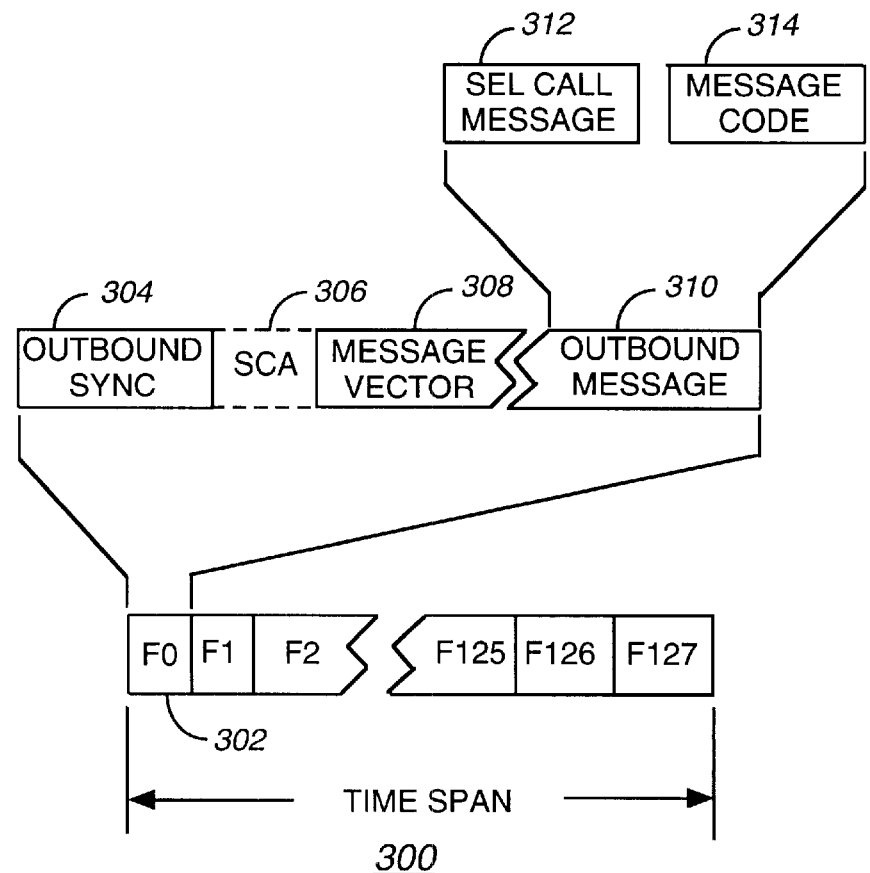
FIG. 3 is a timing diagram depicting the communication protocol used by the communication system of FIG. 1.

FIG. 3 is a timing diagram depicting the communication protocol 300 that is preferably used by the communication system 100. This protocol, developed by Motorola, Inc., is known as the FLEX digital selective call signaling protocol (Flex is a trademark of Motorola, Inc.) that is presently used by various system operators in the United States and in several other countries. More details of the Flex protocol can be found in U.S. Pat. No. 5,371,737, assigned to Motorola, Inc. It will be appreciated that other communication protocols that operate in a synchronous communication system and that are suitable to this invention can be used. However, in the discussion below it is assumed that the Flex protocol is used.

The communication protocol 300 comprises a plurality of synchronous frames 302 (shown as F0, F1, F2, . . . , F127, by way of example). The frames are transmitted during a periodically occurring time span corresponding to a transmission cycle which has a predetermined duration (e.g., 4 minutes), and which includes a predetermined number of frames (e.g., 128 frames). Each frame corresponds to a predetermined time interval (e.g., 1.875 seconds).

A frame includes an outbound sync 304, an optional selective call address 306, a message vector 308, and an outbound message 310. The outbound sync 304 is used by the selective call receivers 102 as a means for bit synchronization utilizing techniques well known in the art. The selective call address 306 is used when selective call messages are transmitted by the high power transmitter 104 to one or more addressed selective call receivers. When a message code is transmitted by the low power transmitter 108, selective call messaging is not required, because the message code is normally intended to be received by all selective call receivers 102 located within the transmission range of the low power transmitter 108. Under these circumstances, the selective call address 306 is not used.

The message vector 308 points to a time within the signaling format of the communication protocol 300 corresponding to the position of the outbound message 3.10 intended to be intercepted by the selective call receiver 102. The outbound message 310 comprises a selective call message 312 when the high power transmitter 104 is transmitting the outbound message 310, or a message code 314 when the outbound message 310 is transmitted by a low power transmitter 108.

It should be noted that the invention is not limited to use with selective call receivers. It is equally well suited to be used with selective call transceivers. Hence, references herein to selective call receivers are meant to include selective call transceivers that have a selective call receiving function.

Figure 4:
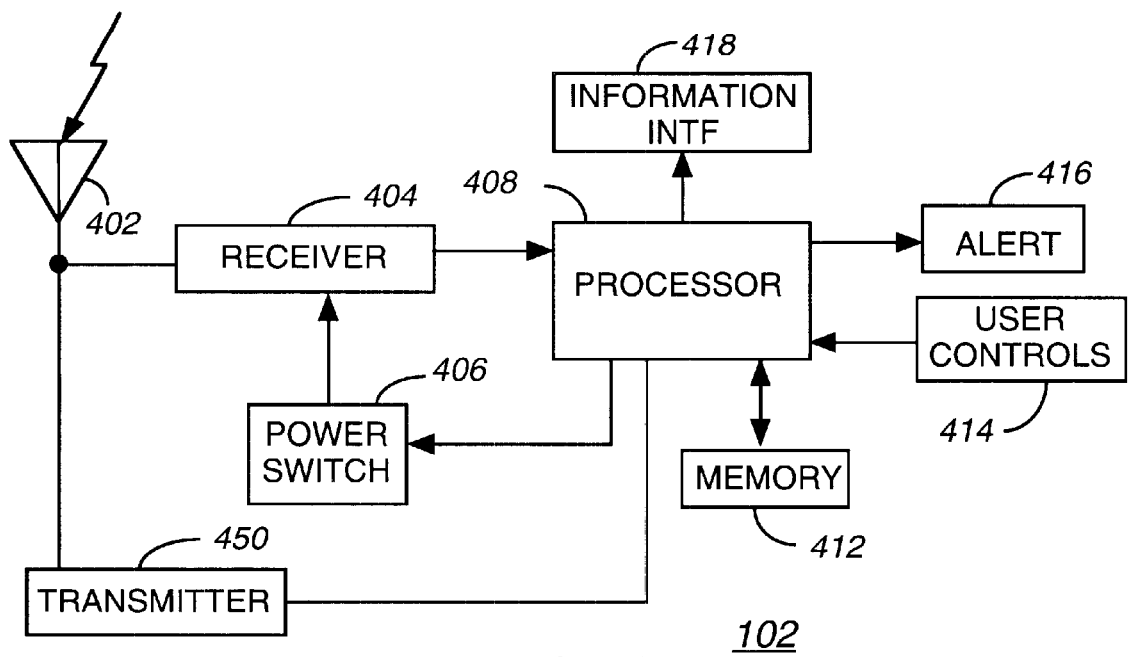
FIG. 4 is an electrical block diagram of a selective call transceiver that operates in the system of FIG. 1.

FIG. 4 is an electrical block diagram of a selective call transceiver 102 that operates according to the present invention. The selective call transceiver 102 comprises an antenna 402, a receiver 404, a power switch 406, a processor 408, a memory 412, user controls 414, an alerting device 416, and an information interface 418. A transmitter 450 is included for using the device 102 in a two-way messaging system. All the hardware included in the selective call transceiver may be conventional.

The antenna 402 is a conventional antenna capable of intercepting FSK signals transmitted from either the high power transmitter 104, or one of the low power transmitters 108. The receiver 404 is a conventional FSK receiver for receiving information during at least one predetermined frame of the communication protocol 300, and for decoding the received information to provide decoded information to the processor 408.

The processor 408 is a conventional processor such as, for example, an MC68HC11 manufactured by Motorola, Inc. The memory 412 coupled to the processor 408 is a conventional memory that includes, for example, a read-only memory (ROM), a random-access memory (RAM), and an electrically erasable read-only memory (EEPROM). The ROM is used for storing the programming information of the processor 408. The programming information directs the processor 408 in controlling the operation of the selective call receiver 102. The RAM is used, for example, for message processing and for storage of selective call messages. The EEPROM is used for storing at least one selective call address for identifying the selective call receiver 102, and for storing at least one canned message. As used herein, the term "canned message" means a message that has been previously stored in memory and is retained for future presentation upon demand.

The power switch 406 is a conventional switch controlled by the processor 408 for strobing the power sourced to the receiver 404, thereby providing a battery saving function.

The processor 408 is programmed to be responsive to decoded information generated by the receiver 404. When the decoded information is a message code 314 received from a low power transmitter, the processor 408 is programmed to identify a corresponding canned message stored in the EEPROM of the memory 412. The selection of the canned message is based, at least in part, on the frame in which the message code 314 was received. As described in greater detail below, this enables the selective call receiver 102 to select and present to its user a certain canned message that is identified by virtue of the frame during which the message code 314 (or other information) was received. This also enables the selective call receiver 102 to determine its location, i.e., which small coverage area 112 it is located in. In contrast, when the decoded information is a selective call message 312 received from the high power; transmitter (such as a typical personal message like "call home"), the processor 408 is programmed to store the selective call message 312 in the RAM.

For both types of messages, the processor 408 is further programmed to alert the user of pending message(s) by way of the alerting device 416, which uses a conventional tactile or audible alerting mechanism. Once the user has been alerted, the user can invoke functions provided by the user controls 414 to perceive the pending message(s). In response to invoking the user controls 414, the processor 408 directs the pending message(s) to the information interface 418. The information interface 418 presents the pending message(s) to the user by way of a conventional liquid crystal display (LCD), or alternatively a conventional audible device for playing out audible messages.

The transmitter 450 may be conventional and is operated under control of the processor 408. This transmitter can preferably respond automatically to certain information received from the system's transmitters, and it can also be operated by the user with the user controls 414.

Figure 5:
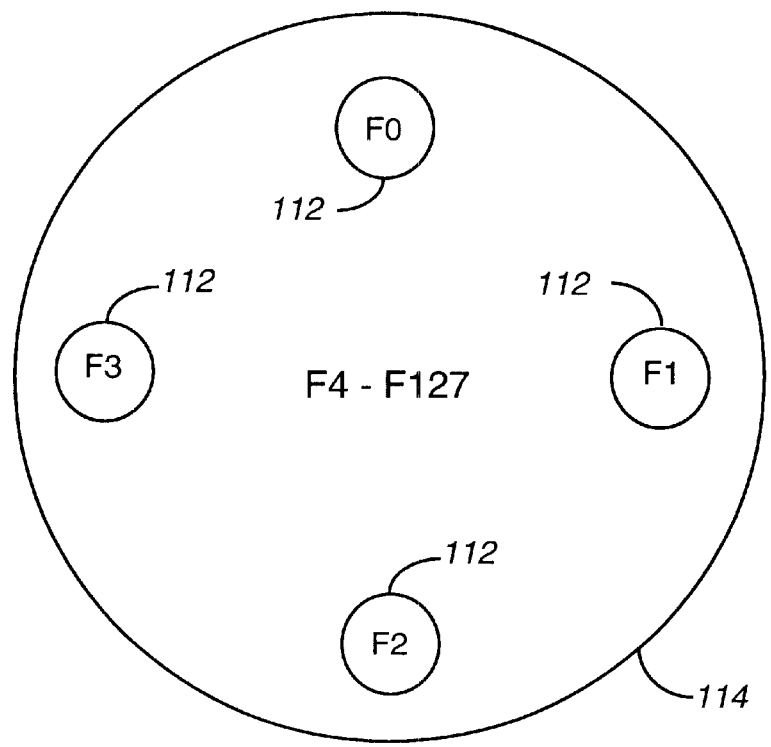
FIG. 5 is a diagram depicting frame assignments in a non-frame reuse communication system for use with the present invention.

FIG. 5 is a diagram depicting exemplary frame assignments in a communication system according to the present invention that does not employ frame reuse, i.e., does not assign a particular frame to more than one low power transmitter 108. In this example, the diagram shows four small coverage areas 112, each of which is assigned one of the frames 0 through 3 (shown as F0, F1, F2, F3). A low power transmitter 108 is located in each of the areas 112, as shown in FIG. 1. In the small coverage area 112 identified by F0, the low power transmitter located therein transmits message codes in frame 0. In the other small coverage areas 112, identified by F1, F2 and F3, the low power transmitters located therein transmit message codes during frames 1, 2, and 3, respectively. Thus, in the arrangement shown in FIG. 5, all of the low power transmitters transmit during frames that are different from each other and different from the frames used by the high power transmitter 104.

A high power transmitter 104 is located in the wide coverage area 114, also as shown in FIG. 1. This high power transmitter is assigned the remainder of frames 4 through 127.

The low power transmitters 108 transmit message codes 314 (FIG. 3) during their assigned frames (F0 through F3), but during all other frames the low power transmitters 108 are inhibited from transmitting message codes 314. Similarly, the high power transmitter 104 transmits during frames 4 through 127, and is inhibited from transmitting during frames 0 through 3. Thus, in the arrangement shown in FIG. 5, each transmitter is assigned one or more frames that are mutually exclusive from the other transmitters. This frame assignment plan substantially prevents signal interference between adjacent transmitters in the communication system.

Frame assignments other than those depicted in FIG. 5 can also be used. For example, if the system operator wishes to allocate more transmission time to the low power transmitters, one way of accomplishing that is to permit each of the transmitters of FIG. 5 to transmit on a first unique frame, and then on each of the following fifth frames. Thus, the transmitter in area 112 that is depicted as transmitting during frame 0 (F0) can. also transmit during every fifth frame thereafter, e.g., during frames 5, 10, 15, etc. The transmitter assigned to frame 1 (F1) would transmit during frames 1, 6, 11, etc. The high power transmitter would transmit during frames 4, 9, 14, etc. The other low power transmitters follow the same pattern. Other frame assignments can also be made, depending on the needs of the users of the system.

Figures 6, 7:
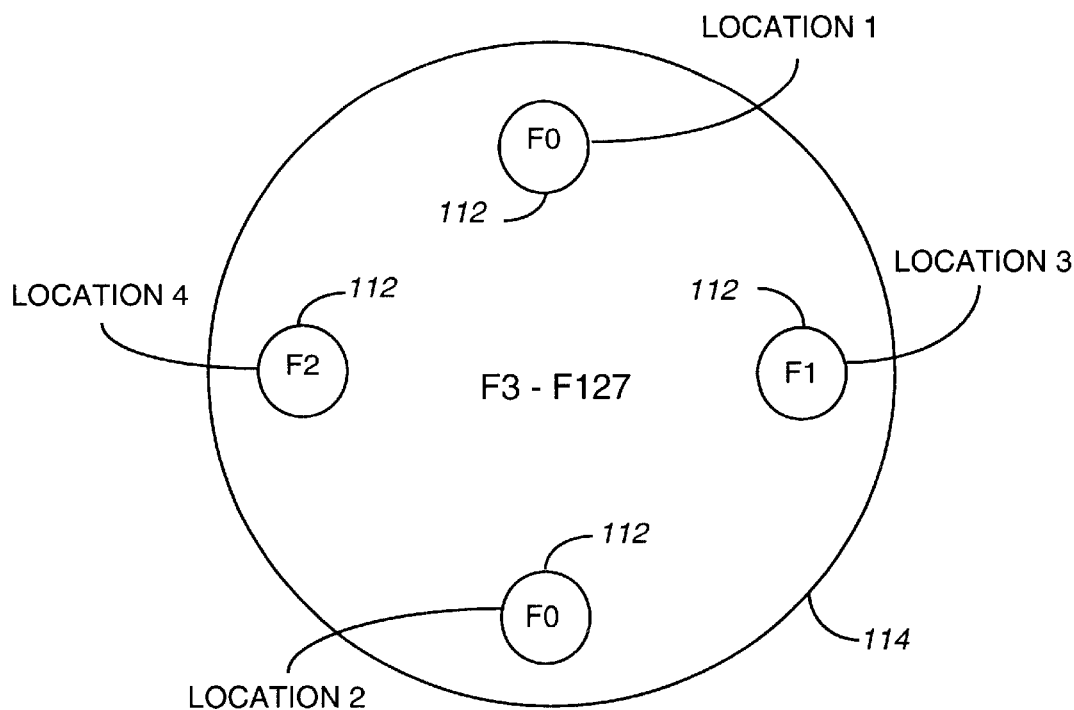
FIG. 6 is a diagram depicting frame assignments in a combined frame reuse and non-frame reuse communication system for use with the present invention.
FIG. 7 is a diagram depicting the arrangement of canned messages in the selective call transceiver of FIG. 4.

FIG. 6 is a diagram depicting frame assignments in a communication system according to the present invention that employs frame reuse, i.e., that assigns the same frame to more than one transmitter. The diagram includes four small coverage areas 112 identified as location 1, location 2, location 3 and location 4. These areas are assigned frames 0, 0, 1, and 2 (shown as F0, F0, F1, F2). A low power transmitter 108 is located in each of the areas 112, as shown in FIG. 1.

In location 1, the low power transmitter located therein transmits message codes in frame 0. In locations 2, 3, and 4, the low power transmitters located therein transmit message codes in frames 0, 1 and 2, respectively. Thus, with the arrangement shown in FIG. 6, low>power transmitters that are mutually remote from each other (locations 1 and 2) are allowed to transmit during a common frame (frame 0 in this example). The distance separating them assures a lack of significant interference by transmitters operating during the same frame. However, transmitters that are adjacent to each other, and more likely to interfere with each other, are preferably required to transmit during different frames. The wide coverage area 114 is assigned the remainder of frames 3 through 127.

As with the arrangement of FIG. 5, the low power transmitters used in FIG. 6 transmit message codes 314 only during their assigned frames. During all other frames, the low power transmitters 108 are inhibited from transmitting message codes 314. Similarly, the high power transmitter 104 transmits on frames 3 through 127, and is inhibited from transmitting on frames 0 through 2. This frame assignment plan successfully combines non-frame reuse and frame reuse plans with substantially minimal signal interference in the one-way communication system.

FIG. 7 is a diagram depicting the preferred arrangement of canned messages in the memory 412 of the selective call receiver 102. The canned messages are conventionally pre-programmed in the EEPROM of the memory 412 by a service provider of the selective call receiver 102. Each group of canned messages is associated with the location of a small coverage area 112 corresponding to a low power transmitter 108. In this example, the first group of canned messages is associated with location 1 in which a low power transmitter transmits during frame 0. The next group of canned messages is associated with location 2, which is relatively remote from location 1, and whose low power transmitter also transmits during frame 0. The other canned messages are similarly associated with locations 3 and 4.

The selective call receiver 102 selects one of its canned messages in the following manner. Referring back to FIG. 7, it can be seen that a selective call receiver 102 stores canned messages 1 through 10 that are associated with location 1 in FIG. 6. Each of the canned messages 1–10 is selected and presented to the user in response to receiving a message code 1 through 10, respectively, during frame 0. Thus, if a selective call receiver 102 receives message code 10 during frame 0, canned message 10 is selected and presented to the user of the selective call receiver 102. Such a canned message may tell the user that "You are in location 1" or "The exhibits in location 1 will close in 10 minutes", for example.

If a selective call receiver receives message code 11 during frame 0, it will select canned message 11 which may tell the user something relevant to location 2.

Similarly, receipt of a message code 1 through 10 during frame 1 causes the selective call receiver 102 to select the corresponding canned message among messages 21–30; and receipt of a message code 1 through 10 during frame 2 causes the selective call receiver 102 to select the corresponding canned message among messages 31–40.

It will be appreciated that an advantage of the present communication system is that a selective call receiver can determine its location based, in whole or in part (depending on the extent of frame reuse) on the frame in which it, receives information. For example, when the selective call receiver 102 receives message code 5 in frame 0, the selective call receiver 102 knows that it is in location 1. When the selective call receiver 102 receives a message code in frame 1, the selective call receiver 102 knows that it is in location 3. Note that determination of location does not require receipt of a message code when information is received during a frame that is unique to one of the locations 112. Thus, a selective call receiver 102 that receives any information during frame 2 will know that it must be in location 4.

It will be appreciated that locations assigned non-reuse frames can reuse message codes (as in the case of locations 3 and 4), while locations assigned reuse frames must be assigned unique message codes (as in the case of locations 1 and 2) in order for selective call receivers 102 to be able to determine which small coverage area 112 they are located in.

It will be further appreciated that in the case where message codes 314 are accompanied by message information, the selective call receiver 102 presents the message information to the user by way of the information interface 418. The message code 314 number informs the selective call receiver 102 of its location, and that message information is appended to the message code 314.

It will also be appreciated that the message code 314 is also used by the selective call receiver 102 for identifying a canned message. The selective call receiver 102 presents the canned message and message information to the user by way of the information interface 418. For instance, the user might be told through the information interface 41.8, "News Flash! Exhibit 4 in location 1 is now open." The message "News Flash" is, for example, a canned message corresponding to the message code 314, while the message "Exhibit 4 in location 1 is now open" is, for example, the message information.

Figure 8:
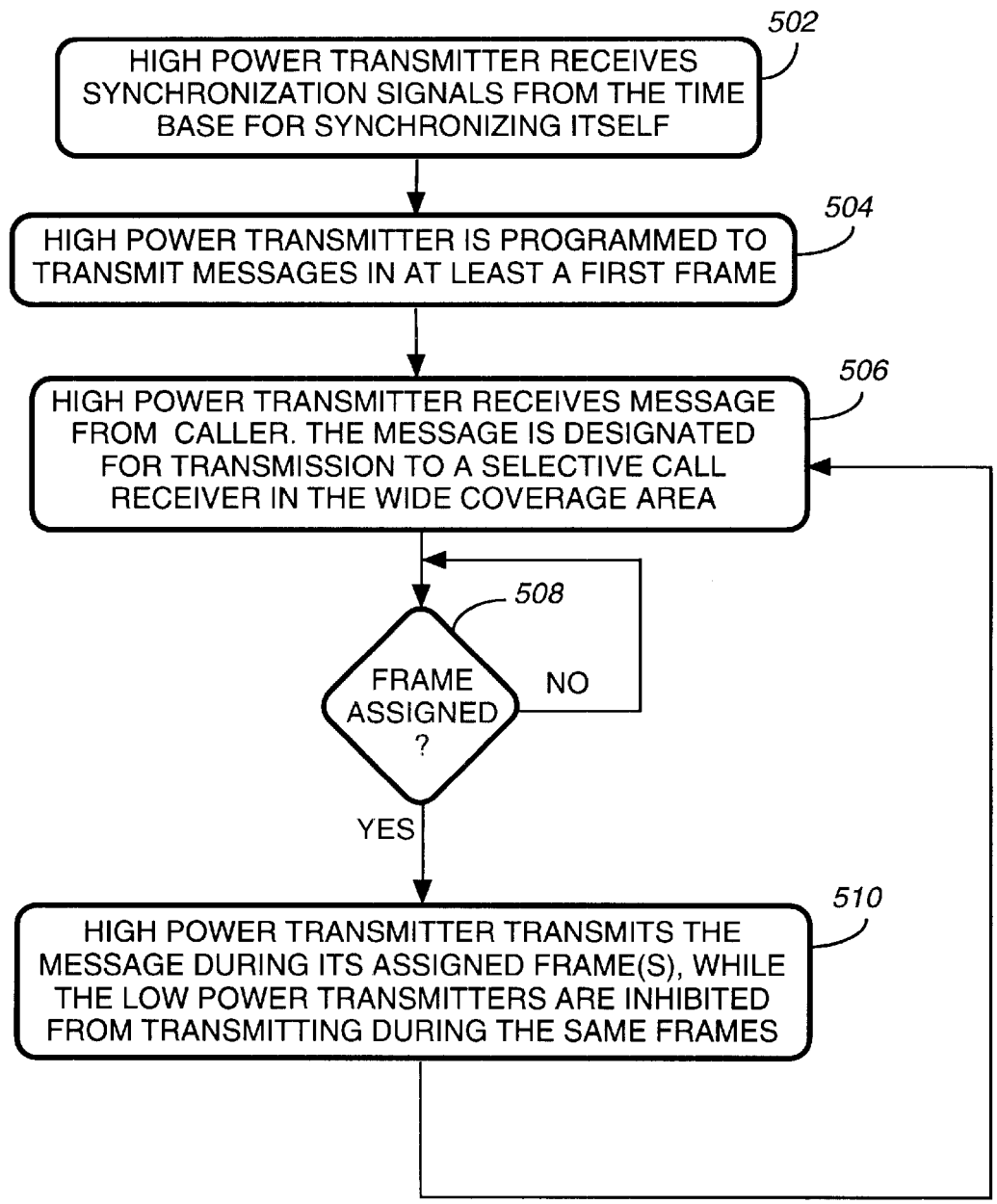
FIG. 8 is a flow chart showing how the high power transmitter operates.

FIG. 8 is a flow chart 500 of the high power transmitter 104 operation according to the present invention. Instructions that correspond to the steps shown in the flow chart 500 are programmed into the controller 206 of the transmitter 104.

The flow chart 500 begins with step 502 where the high power transmitter 104 receives synchronization signals from the time base 212 for synchronizing the high power transmitter 104 to frames 302 included in the periodically occurring transmission cycle of the communication protocol 300. In step 504, the high power transmitter 104 transmits selective call messages 312 in at least a first predetermined time interval corresponding to at least a first frame assigned to the high power transmitter 104. Using the example shown in FIG. 5, the high power transmitter 104 transmits messages during frames F4 through F127, although it is not a requirement of this invention that the high power transmitter 104 transmit during more than one frame.

In step 506, the high power transmitter 104 receives a message from a caller using the PSTN. The message is designated for transmission to one of the selective call receivers 102 in the wide coverage area 114. In step 508, the high power transmitter 104 waits for the arrival of an assigned frame 302 before transmitting the selective call message 312. When an assigned frame 302 arrives, the program proceeds to step 510 where it transmits the selective call message 312 during at least the first assigned frame, while the low power transmitters 108 are inhibited from transmitting during the same frame(s). Once the selective call message 312 has been transmitted, the high power transmitter 104 returns to step 506 to process further messages received from callers. This process continues until all messages have been transmitted or until the allotted time for the assigned frames has elapsed.

Figure 9:
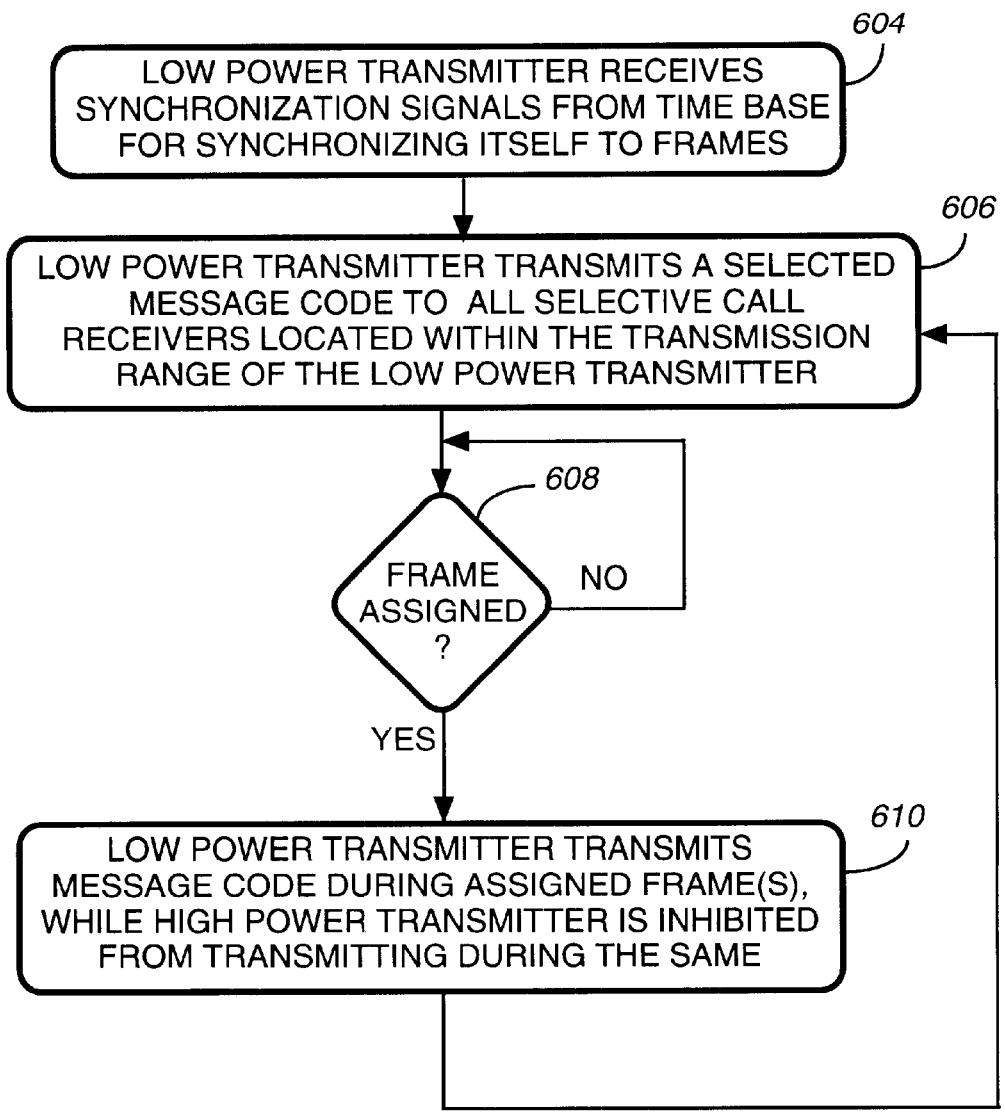
FIG. 9 is a flow chart showing how the low power transmitter operates

FIG. 9 is a flow chart 600 of the low power transmitter 108 operation according to the present invention. Instructions that correspond to the steps shown in the flow chart 600 are programmed into the controller of each low power transmitter 108.

Prior to operation in the field, the low power transmitter 108 is programmed by a service provider with message codes to be selectively transmitted in at least a second predetermined, time interval corresponding to at least a second frame assigned to the low power transmitter 108.

The flow chart 600 begins with step 604 where the low power transmitter 108 receives synchronization signals from the time base 212 for synchronizing the low power transmitter to frames 302 included in the periodically occurring transmission cycle of the communication protocol 300. In step 606, the low power transmitter 108 selects a message code 314 from the group of message codes preprogrammed by the service, provider. The selected message code is designated for transmission to all selective call receivers 102 located within the transmission range of the low power transmitter 108. In step 608, the low power transmitter 108 waits for an assigned frame 302 before transmitting the message code 314. Using the example shown in FIG. 5, the low power transmitter 108 waits for one of the frames 0, 1, 2 or 3, depending on which low power transmitter 1.08 is preparing to transmit.

When an assigned frame 302 arrives, the low power transmitter 108 proceeds to step 610 where it transmits the selective call message code 314 during its assigned frame(s), while the high power transmitter 104 is inhibited from transmitting during the same frame(s). Once the message code 314 has been transmitted, the program proceeds to step 606 to select further message codes for transmission.

Figure 10:
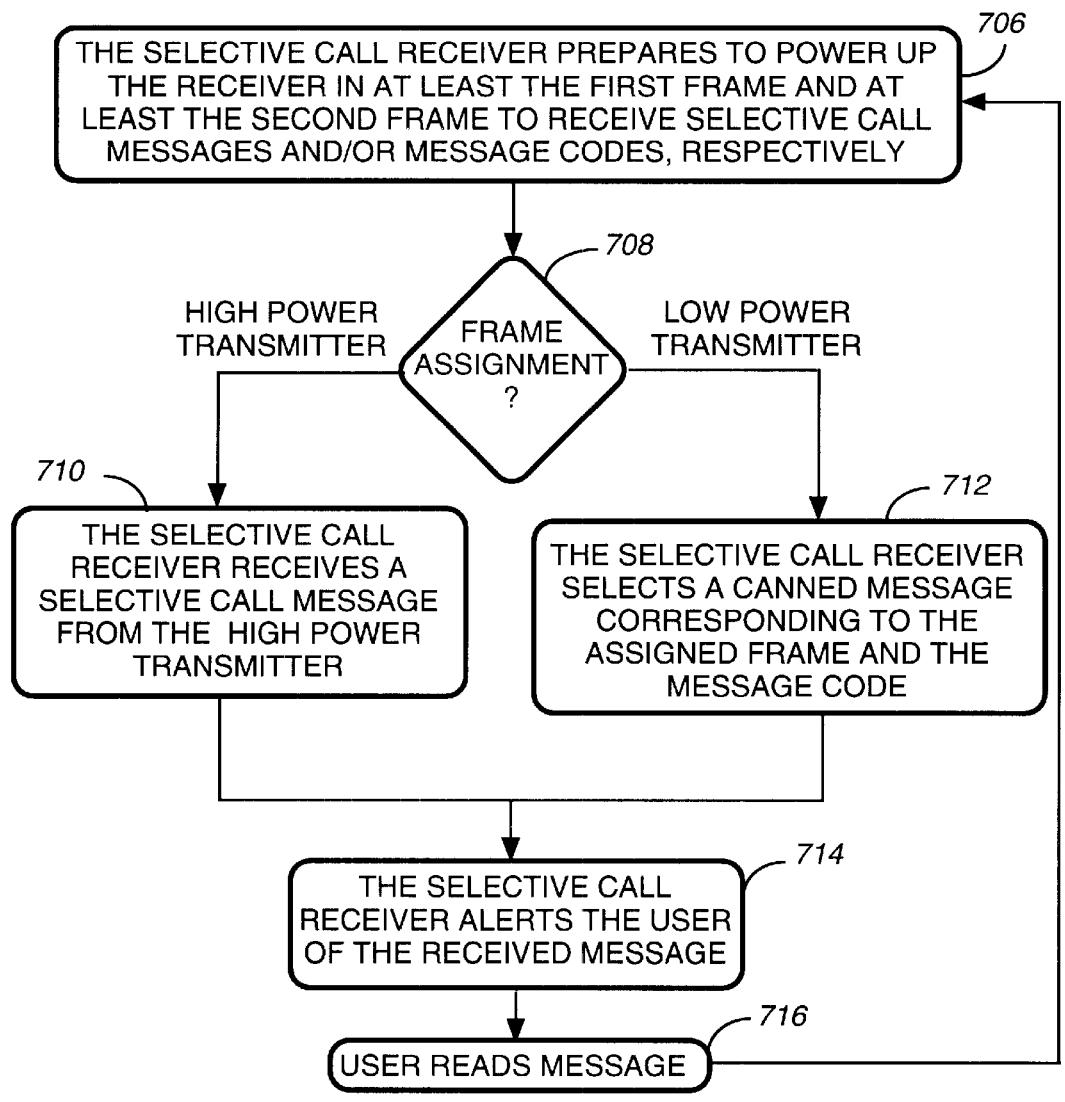
FIG. 10 is a flow chart showing how the selective call receiver operates.

FIG. 10 is a flow chart 700 showing how the selective call receiver 102 is programmed to operate according to the present invention. Instructions that correspond to the steps shown in the flow chart 700 are stored in the memory of the selective call receiver 102.

Prior to operation in the field, the selective call receiver 102 is programmed with groups of canned messages stored in the memory 412. Each group of canned messages is associated with message codes and frames corresponding to the location of each low power transmitter 108 in the communication system. The selective call receiver 102 is further programmed to receive selective call messages 312 in at least a first frame from the high power transmitter 104, and message codes 314 in at least a second frame from a low power transmitter 108.

For example, the selective call receiver 102 may be programmed to receive transmissions from the high power transmitter 104 during frames 4 through 127, and to receive transmissions from a low power transmitter 108 during frame 0 (assuming that the selective call receiver is expected to remain in the small coverage area in which transmissions are made during frame 0). If the selective call receiver 102 is expected to move from one to another of all the small coverage areas 112, then it should be programmed to receive transmissions during all the frames assigned to the low power transmitters 108 (i.e., frames 0, 1, 2 and 3).

The flow chart 700 begins with step 706 where the selective call receiver 102 prepares to power up the receiver 404 during its assigned frames to receive selective call messages 312 and/or message codes 314, respectively. In step 708, the selective call receiver 102 waits for the arrival of an assigned frame. Assuming that one of the frames 4–127 arrives, (assigned to the high power transmitter), the program proceeds to step 710 to process the message sent by the high power transmitter. When one of the frames 0–3 (assigned to the low power transmitters) arrives and a message code 314 is intercepted, the program proceeds to step 712 where it selects a canned message corresponding to the assigned frame and message code 314 received.

Once the selective call message 312 and/or the message code 314 has been processed, the selective call receiver 102 proceeds to step 714 where it alerts the user, by way of the alerting device 416, of the pending message(s) received. In step 716, the user reads the message by invoking functions provided by the user controls 414. The selective call receiver 102 then returns to step 706 to prepare to receive further messages from the communication system.

The invention also allows a user of a selective call receiver 102 to determine the present location of the receiver 102 (and, thus, the location of the user), and to also determine the route by which the receiver 102 arrived at its present location. As will be described more fully below, such determination can be made, in one embodiment, by interrogating the selective call receiver itself. In another embodiment, the user or another interested party may interrogate the communication system to learn where the receiver. 102 is presently located and/or the route it took to arrive at its present location.

Figure 11:
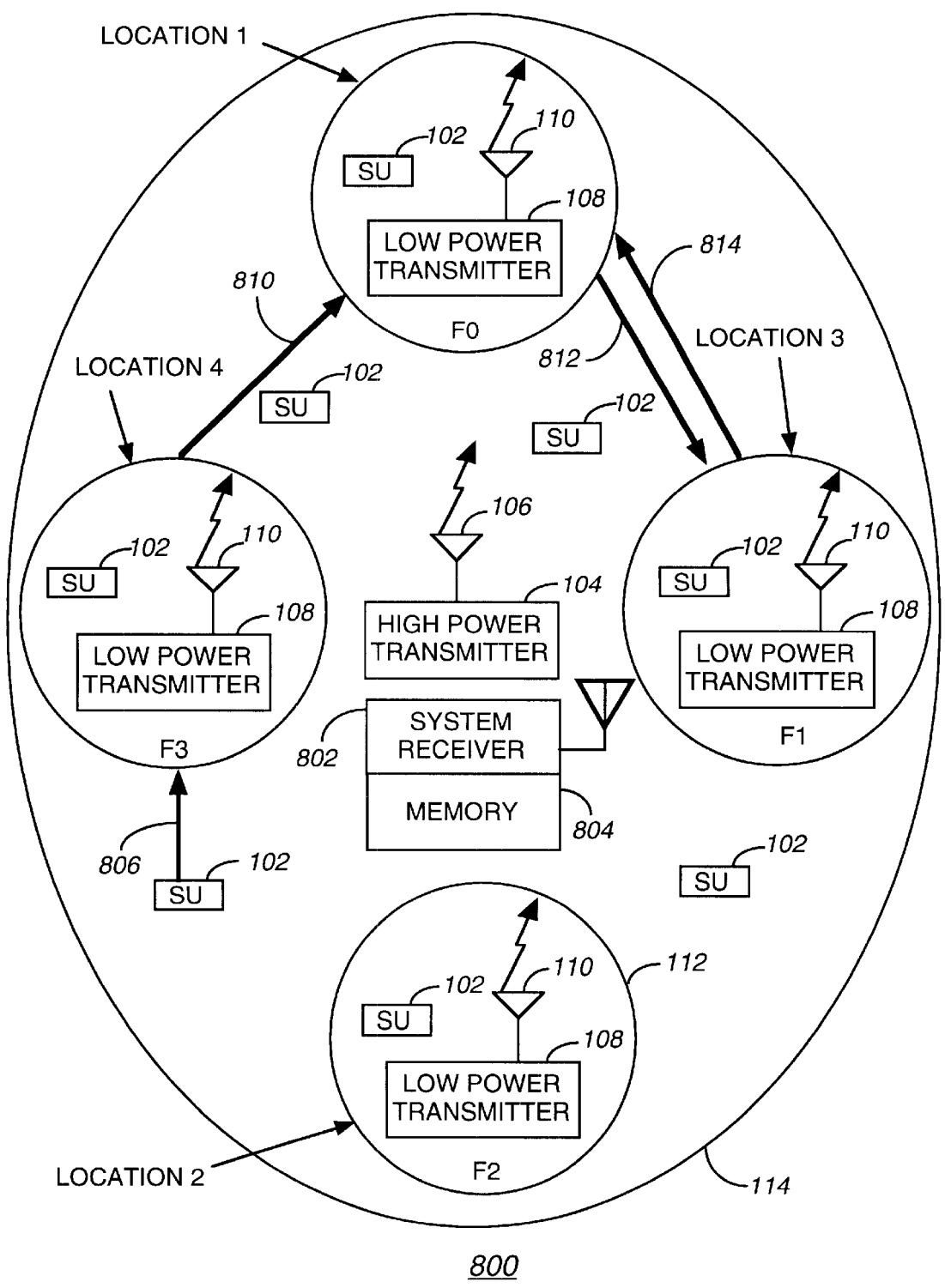
FIG. 11 depicts a communication system that operates in accordance with the invention.

Referring to FIG. 11, a communication system 800 is adapted to provide receiver location information in accordance with the invention. It will be noted that the system 800 is identical to the system 100 (FIG. 1), except that the system 800 is shown with a system receiver 802 and a memory 804. In addition, the selective call receivers of FIG. 1 are referred to as subscriber units (S.U.) in FIG. 11. A subscriber unit is either a selective call receiver or a selective call transceiver that is subscribed to the service provided by the operator/owner of the communication system 800.

In the illustrated system, the high power transmitter 104 transmits information to subscriber units throughout a relatively wide coverage area 114. The high power transmitter operates as described previously in that it is caused to transmit information, such as conventional messages, on a given frequency and during at least a first predetermined time interval (such as a frame) within a periodically occurring time span.

At least one relatively low power transmitter transmits information to subscriber units within a relatively smaller coverage area that overlaps the relatively wide coverage area. As described above, this transmission by the low power transmitter occurs on the same given frequency but during a predetermined time interval (a frame, for example) that differs from the time interval assigned to the high power transmitter.

In the system 800, all the transmitters and subscriber units preferably operate with the Flex protocol referenced above, and at least some of the transmitters use different assigned frames of a transmission cycle for transmitting information on a common frequency. In a system that does not employ frame reuse, such as in FIG. 11, all of the low power transmitters 108 transmit during different assigned frames. A subscriber unit 102 that is within range of a transmitting transmitter receives the transmitted information and identifies the coverage area from which the information was transmitted. The subscriber unit's identification of the coverage area is based, at least in part, on the frame that was used to transmit the received information. Thus, a subscriber unit receiving information transmitted during frame 3 (F3) knows that it must be in location 4 shown in FIG. 11, because that is the only transmitter using frame 3, That subscriber unit stores, in its memory 412 (FIG. 4), an indication of the identified coverage area (location 4) for later retrieval.

In the system shown in FIG. 11, the high power transmitter 104 transmits conventional messages, but does not transmit location information. Location information is transmitted only by the low power transmitters 108, and such information is transmitted periodically. For example, if it is desirable to update location information every four minutes, then the low power transmitters transmit location information once during every transmission cycle. Similarly, the low power transmitters may transmit location information every fifteen minutes, every hour, every day, etc., depending on the resolution desired as to location information.

Whenever location information is being transmitted, it is preferable to send with it an indicator of location information. The purpose of the indicator is to alert the receiving subscriber unit that the information being sent is location information rather than a conventional message.

The indicator of location information transmitted by the low power transmitters 108 may take various forms. In a simple form, the indicator may simply consist of numeric data that is transmitted, for example, in the time slot where a message vector 308 (FIG. 3) is normally sent. The subscriber unit interprets the numeric data as an instruction to store location information in a designated place in its memory that is reserved for location information. This stored location information can be information sent by a transmitter, or it can be the subscriber unit's own determination as to where it is located. For example, if a subscriber unit in the system of FIG. 11 received such an indicator (and nothing more) from a low power transmitter operating during frame 3, the subscriber unit knows it must be in location 4, and therefore stores, in its designated place in memory, an indication that it is in location 4.

Another preferred aspect of the system operation is that each time a transmitter transmits location information, it includes a time stamp with the location information. (A time stamp is an indication of the time of day, and possibly the date, when the location information was transmitted.) When a subscriber unit stores received location information, it also preferably stores the time stamp that accompanied the location information. This provides a history of when the subscriber unit was situated in various locations, thereby providing information as to the route taken by the subscriber unit in arriving at its present location.

In addition to sending the location indicator and a time stamp, the low power transmitters may additionally transmit the information described previously in connection with FIGS. 3 through 7. For example, a message code 314 (FIG. 3) may be included to elicit the presentation of a canned message that identifies the subscriber unit's location.

The following example shows how a subscriber unit can identify its present location, and the route it took to arrive at its present location. In FIG. 11, assume that a subscriber unit 102 enters location 4 via path 806 at 8:00 o'clock, and that it simultaneously receives, during frame 3, a transmission from the low power transmitter in location 4. That transmission includes an indicator for location information plus a time stamp.

Figures 12, 14:
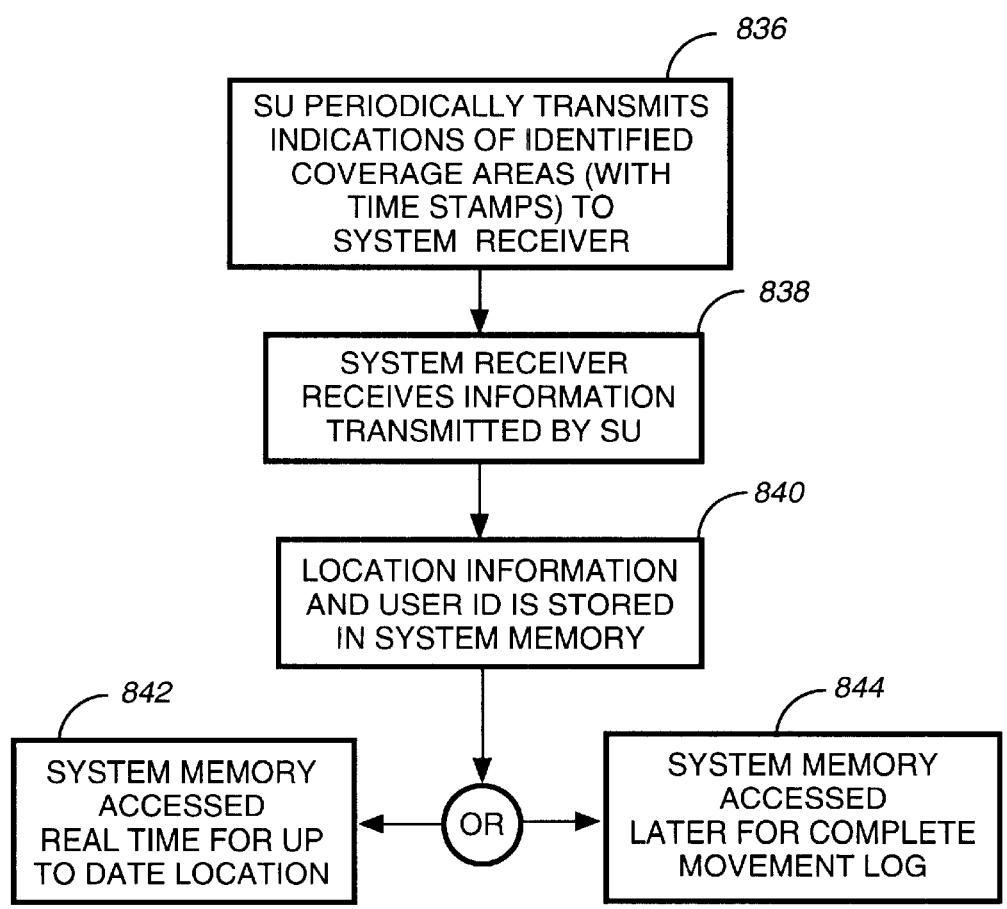
FIG. 12 depicts a portion of a subscriber unit's memory with location information stored therein.
FIGS. 13 and 14 are flow charts showing how the communication system and a subscriber unit are programmed to operate in accordance with the invention.

Because of the indicator, the subscriber unit knows that the purpose of the received transmission is to inform the subscriber unit of its location. Consequently, the subscriber unit accesses its memory 412 (FIG. 4) in which it preferably has a preselected memory location that is dedicated to storing location information. Such a dedicated memory location 808 is shown in FIG. 12. Because the subscriber unit knows that it received the transmission during frame 3, its processor 408 accesses a look-up table which correlates frame 3 with location 4. The subscriber unit then stores, in its memory location 808, an indication that it received a transmission on frame 3, that the corresponding location is location 4, and the time stamp (8:00 o'clock in this example).

Assume that the subscriber unit remains temporarily in location 4 and receives two additional location information transmissions from the transmitter in location 4. If these transmissions are received with time stamps indicating that they were sent at 8:15 and 8:30 o'clock, respectively, then the subscriber unit would store, in its memory location 808, the information as shown in FIG. 12 for the times 8:15 and 8:30.

Assume now that the subscriber unit moves from location 4 to location 1 (path 810) and, while in location 1 at 8:45 o'clock, receives a location information transmission from the low power transmitter in location 1 during frame 0. That transmission includes an indicator for location information plus a time stamp. Because this transmission occurred during frame 0, the subscriber unit knows (as from its look-up table) that it is in location 1. The subscriber unit's processor 408 accesses the subscriber unit's memory and stores in memory location 808 (FIG. 12) the information shown for the time 8:45.

The remaining information stored in memory location 808 results from the following movements of the subscriber unit. The subscriber unit moves from location 1 to location 3 via path 812. While in location 3, the subscriber unit receives a location information transmission having a time stamp of 9:00 o'clock during frame 1. While remaining in location 3, the subscriber unit receives two additional location information transmissions during frame 1, with time stamps of 9:15 and 9:30, respectively.

Shortly thereafter, the subscriber unit returns to location 1 via path 814. While in location 1, the subscriber unit receives a location information transmission during frame 0 with a time stamp of 10:00 o'clock.

The location information transmitted in the foregoing example involved each of the low power transmitters sending location information periodically (every 15 minutes). As mentioned previously, the frequency with which such information is sent depends on the resolution desired. It should also be understood that the high power transmitter 104, and one or more of the low power transmitters 108, may transmit conventional messages when they are not transmitting location information.

The information stored in the memory location 808 can be retrieved in a number of ways, depending on the capability of the system and the subscriber units used in the system. In a one-way system (in which the subscriber units can operate only in a receive mode), the information stored in memory location 808 may not be user accessible. Rather, it may remain stored until the information is downloaded into a larger database. This mode of operation may by used, for example, when the system operator desires to discern a pattern of movement as to users within the area 114.

In applications where the subscriber unit is intended to assist the user in determining his location, the stored location information is retrieved upon user demand. This is accomplished by the user activating the user controls 414 (FIG. 4)

to display at least the last location entry, corresponding to the subscriber unit's current location, on the information interface 418.

The invention is also advantageously used in a two-way system (in which the subscriber unit can reply to the system), such as a two-way messaging system that uses the ReFlex protocol developed by Motorola, Inc. (ReFlex is a trademark of Motorola, Inc.). The transceiver 102 of FIG. 4 can operate with the ReFlex protocol (or any conventional two-way protocol) to provide two-way messaging that incorporates the invention. Knowledge of specific details of the transceiver 102, though not necessary to understand this invention, may be found in a Tango pager made by Motorola, Inc. (Tango is a trademark of Motorola, Inc.) The use of such a transceiver as a subscriber unit operating in the system of FIG. 11 allows an authorized third party (such as a parent) to determine the location of a subscriber unit user (such as a child) in the area 114. The manner in which this is achieved will now be explained with reference to the flow charts shown in FIGS. 13 and 14. These flow charts show how the communication system of FIG. 11, and a subscriber unit operating in that system, are programmed to operate according to the invention.

Figure 13:
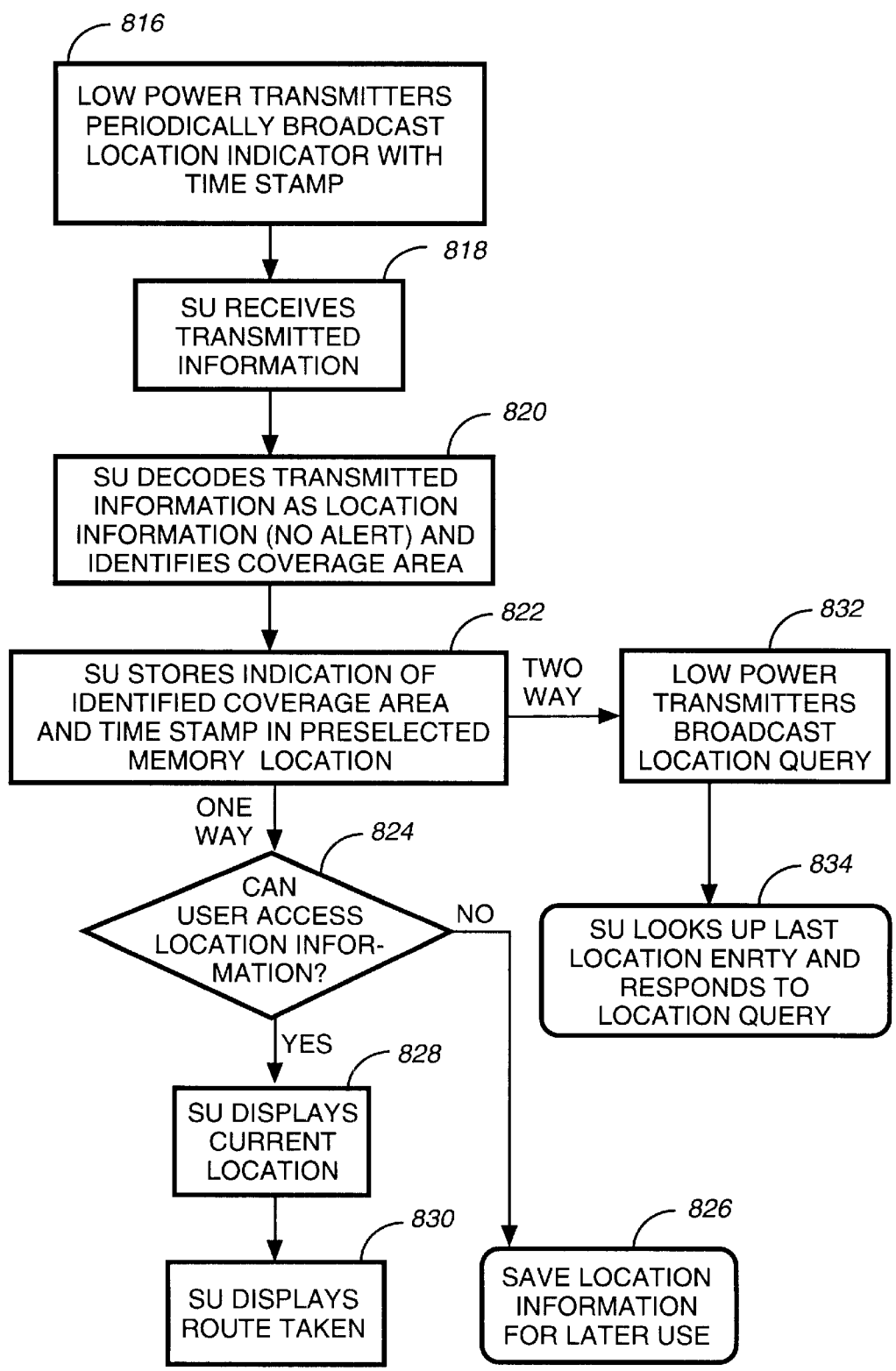

Referring first to FIG. 13, the first step 816 requires that all the low power transmitters 108 periodically broadcast the location indicator with a time stamp for each transmission. In the next step 818, the subscriber unit in the coverage area receives the information transmitted per step 816. Per the next step 820, a subscriber unit decodes the transmitted information as location information and identifies the coverage area from which the transmitted information originated. Then, per step 822, the subscriber unit stores an indication of the identified coverage area, along with a time stamp, in its preselected memory location 808, as shown in FIG. 12.

In the case where the subscriber unit is operating in a one way communication system, the next step which is executed is 824. This step, executed by the subscriber unit, asks whether the user can access the location information that was stored per step 822. If the answer is "no", the next step 826 saves the stored location information for later use. For example, the information stored in the memory location 808 may be later accessed for storage in a larger database.

If the subscriber unit is of the type that allows the user to access his location information, step 824 is followed by step 828 which causes the subscriber unit to display its current location in response, for example, to actuation of one of the user controls 414. The program then proceeds to step 830 per which the subscriber unit displays the route taken by the subscriber unit. Per this instruction, and a user demand, the information stored in memory location 808 is displayed sequentially so that the user can look back and determine where and when the subscriber unit was located throughout the area 114.

If the subscriber unit is capable of two-way operation, the program proceeds from step 822 to step 832 whereby the low power transmitters broadcast a location query. This location query is nothing more than a "where are you?" query that is transmitted in a two-way messaging protocol such as the Reflex protocol referred to above. In the next step 834, the subscriber unit replies to the location query by looking up its last location entry in its memory location 808 and transmitting that entry to the system receiver 802 (FIG. 11). It should be understood that the location query is preferably transmitted periodically so that the communication system can store in its memory 804 information of the type shown in FIG. 12 for each subscriber unit operating in the system. This enables the system operator to access the memory 804 and to discern the patterns of movement of the various subscriber units. Another advantage of this operation is that it allows an interested party to call the system operator and request information as to the location of any specific subscriber unit. That information can be retrieved from the memory 804, or the latest information can be determined by having the, low power transmitters transmit a special location query to the designated subscriber unit to update the information in the system memory 804.

An alternate way of collecting information for storing in the system memory 804 is shown in the flowchart of FIG. 14. In the first step 836, each two-way subscriber unit periodically transmits indications of identified coverage areas to the system receiver 804. Each such indication is sent along with the stored time stamp. Thus, each piece of stored location information shown in FIG. 12 is automatically transmitted by the subscriber unit back to the system receiver 802 for storage in the memory 804 on a periodic basis and without prompting by the communication system.

The system receiver 802 receives the information transmitted by the subscriber unit per step 838 and stores that received location information plus the ID (identification number) of the subscriber unit in the system memory 804 (step 840). The information thus stored in the system memory 804 can be accessed in one of two ways. Per step 842, any interested and/or authorized person may access the system memory 804 to obtain location information regarding any subscriber unit operating within the system. This may be done, for example by calling into the operator of the system shown in FIG. 11 and requesting location information on a specified subscriber unit. Alternately, as per step 844, the location information regarding the various subscriber units may be collected in the system memory 804 and retained there for later analysis. For example, the system operator or another interested party may wish to create a complete movement log for any one or all of the subscriber units so as to obtain an indication of the pattern of the movement within the coverage area.

The present invention provides a simple and low cost method for determining the location of a subscriber unit within a communication system. A subscriber unit operating within the system is able to determine where it is located and, optionally, its route to its present location. The same information can be stored in a system memory for retrieval by the system operator or other authorized person.

What is claimed is:

1. A method of determining the location of a subscriber unit operating in a communication system having transmitters that transmit information to the subscriber unit, each transmitter transmitting substantially within its own coverage area, the method comprising:

causing at least some of the transmitters to use different assigned time intervals of a transmission cycle for transmitting information;

receiving, at the subscriber unit, information transmitted during at least one of the assigned time intervals;

identifying, at the subscriber unit, the coverage area of a transmitter from which received information was transmitted, based, at least in part, on which time interval was used to transmit the received information; and storing an indication of an identified coverage area for later retrieval.

2. A method as set forth in claim 1 wherein the communication system includes a receiver and a memory, wherein the subscriber unit stores location information sent by the transmitters, and further including:

causing the subscriber unit to transmit stored location information to the receiver; and storing, in the memory, location information transmitted by the subscriber unit, thereby to record movement of the subscriber unit.

3. A method as set forth in claim 1 wherein the transmitters are low power transmitters, and wherein the communication system includes a high power transmitter for transmitting throughout a large coverage area that substantially includes coverage areas of the low power transmitters, and where all the transmitters transmit on a common frequency.

4. A method as set forth in claim 1 wherein the information transmitted includes an indicator for location information, wherein the subscriber unit includes a memory for holding information relating to location, and wherein the subscriber unit responds to the indicator by storing location information in the memory.

5. A method as set forth in claim 4 wherein the transmitters transmit the indicator periodically.

6. A method as set forth in claim 5 wherein the transmitters transmit a time stamp with the indicator, and wherein the subscriber unit stores the time stamp with location information.

7. A method of determining the location of a subscriber unit operating in a communication system having a high power transmitter for transmitting information throughout a wide coverage area, and having low power transmitters for transmitting information within their own smaller coverage areas located substantially within the wide coverage area, the method comprising:

causing the high power transmitter and the low power transmitters to repeatedly transmit information throughout their respective coverage areas, the transmitters using a common frequency and different assigned frames of a transmission cycle for transmitting information, and the information transmitted by the low power transmitters including an indicator for location information and a time stamp; and at the subscriber unit:
      receiving information transmitted during at least one of the assigned frames;
      identifying a coverage area from which received information was transmitted, based, at least in part on which frame was used to transmit the received information;
      and storing location information, including the identity of an identified coverage area with a time stamp for later retrieval.

8. A method as set forth in claim 7 wherein the communication system includes a receiver and a memory, and further including:

causing the subscriber unit to transmit stored location information to the receiver; and storing, in the memory, location information transmitted by the subscriber unit.

9. A method of tracking the movement of a subscriber unit operating in a communication system having transmitters that are located in different coverage areas and that use different frames of a transmission cycle to transmit information on a common frequency, the method comprising, in the subscriber unit:

receiving transmitted information;

identifying a coverage area from which received information was transmitted, based, at least in part, on which frame was used to transmit the received information; and storing an indication of an identified coverage area for later retrieval.

10. A method as set forth in claim 9, including:

storing successive indications of identified areas as the subscriber unit moves from coverage area to coverage area; and displaying, at user demand, at least a most recently stored indication to show the subscriber unit's current location.

11. A method as set forth in claim 9 wherein the communication system includes a receiver, and further including causing the subscriber unit to periodically transmit, to the receiver, stored indications of identified areas.

12. A method as set forth in claim 11 including transmitting a time stamp with a transmitted indication.

13. A method as set forth in claim 9 wherein the communication system includes a receiver and a memory, wherein a transmitter sends location queries to subscriber units, and further including causing the subscriber unit to respond to a location query by transmitting at least one stored indication to the receiver for storage in the memory.

14. A method of tracking the movement of a subscriber unit operating in a communication system having a receiver and having transmitters that are located in different areas and that use different frames of a transmission cycle to transmit information on a common frequency, the method comprising, in the subscriber unit:

receiving transmitted information;

identifying a coverage area from which the received information was transmitted based, at least in part, on which frame was used to transmit the received information;

storing indications of identified coverage areas, and storing a time stamp with each such indication; and transmitting to the receiver at least a most recently stored indication of an identified coverage area.

* * * * *